US006965946B2

(12) United States Patent
Inoue et al.

(10) Patent No.: US 6,965,946 B2
(45) Date of Patent: *Nov. 15, 2005

(54) METHOD AND APPARATUS FOR COMMUNICATION CONTROL OF MOBILE COMPUTERS IN COMMUNICATION NETWORK SYSTEMS USING PRIVATE IP ADDRESSES

(75) Inventors: Atsushi Inoue, Kanagawa (JP); Masahiro Ishiyama, Tokyo (JP); Osamu Moriya, Kanagawa (JP); Atsushi Shimbo, Chiba (JP); Toshio Okamoto, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 269 days.

This patent is subject to a terminal disclaimer.

(21) Appl. No.: 10/180,534

(22) Filed: Jun. 27, 2002

(65) Prior Publication Data

US 2002/0161927 A1 Oct. 31, 2002

Related U.S. Application Data

(62) Division of application No. 08/784,309, filed on Jan. 16, 1997, now Pat. No. 6,442,616.

(30) Foreign Application Priority Data

Jan. 17, 1996 (JP) .......................................... P8-005886

(51) Int. Cl.$^7$ ............................................... G60F 15/16
(52) U.S. Cl. ..................... 709/245; 709/228; 455/432.1
(58) Field of Search ................................ 709/223, 245, 709/227, 228; 455/432, 444, 433, 434, 435; 370/254, 328, 475

(56) References Cited

U.S. PATENT DOCUMENTS 5,159,592 A   10/1992  Perkins (Continued)

OTHER PUBLICATIONS

Perkins, "IP Mobility Support Draft–ietf–mobileip–protocol–17.txt", Internet Engineering Task Force, Internet Draft (May 1996), pp. 1–79.

Teraoka et al., "VIP: A Protocol Providing Host Mobility," Communications of the ACM, (1994) 37(8):66–75.

Droms, "Dynamic Host Configuration Protocol," Network Working Group Request for Comments: 1541, Obsoletos: 1531, Category: Standard Track (1993), pp. 1–29.

Rekhter et al., "Address Allocation for Private Internets," RFC 1597 (Mar. 1994), 8 pages.

Egevang et al., "The IP Network Address Translator (NAT)," RFC 1631 (May 1994), 10 pages.

*Primary Examiner*—William C. Vaughn, Jr.
(74) *Attorney, Agent, or Firm*—Foley & Lardner LLP

(57) ABSTRACT

A communication control in a communication network system using a mobile computer, capable of realizing flexible address control and management for the mobile computer. When the mobile computer is located within a home network, a communication with the mobile computer is carried out by transferring data using a home address specific to the mobile computer which is a private address. When the mobile computer is located within an external own organization network, a communication with the mobile computer is carried out by routing data to the external own organization network using a care-of address indicating a current visited location of the mobile computer in the system which is a global address, and addressing the mobile computer within the external own organization network using the home address. When the mobile computer is located within an external other organization network, a communication with the mobile computer is carried out by routing data to the external other organization network using the care-of address, and addressing the mobile computer within the external other organization network using a mobile address assigned to the mobile computer at a time of moving outside the own organization networks which is a global address.

4 Claims, 9 Drawing Sheets

U.S. PATENT DOCUMENTS

| | | | |
|---|---|---|---|
| 5,241,686 A | | 8/1993 | Charbonnier |
| 5,325,362 A | | 6/1994 | Aziz |
| 5,363,369 A | | 11/1994 | Hemmady et al. |
| 5,457,680 A | | 10/1995 | Kamm et al. |
| 5,467,341 A | | 11/1995 | Matsukane et al. |
| 5,517,618 A | | 5/1996 | Wada et al. |
| 5,557,748 A | | 9/1996 | Norris |
| 5,572,221 A | | 11/1996 | Marlevi et al. |
| 5,572,528 A | * | 11/1996 | Shuen ............ 370/402 |
| 5,579,375 A | | 11/1996 | Ginter |
| 5,673,031 A | * | 9/1997 | Meier ............ 340/2.4 |
| 5,774,461 A | | 6/1998 | Hyden et al. |
| 5,793,762 A | * | 8/1998 | Penners et al. ............ 370/389 |
| 5,793,763 A | | 8/1998 | Mayes et al. |
| 5,796,727 A | * | 8/1998 | Harrison et al. ............ 370/338 |
| 5,841,769 A | * | 11/1998 | Okanoue et al. ............ 370/338 |
| 5,907,540 A | | 5/1999 | Hayashi |
| 5,930,239 A | * | 7/1999 | Turcotte ............ 370/310 |
| 5,940,771 A | * | 8/1999 | Gollnick et al. ............ 455/517 |
| 6,064,887 A | | 5/2000 | Kallioniemi et al. |
| 6,070,076 A | | 5/2000 | Valentine |
| 6,072,875 A | | 6/2000 | Tsudik |
| 6,078,804 A | | 6/2000 | Alperovich et al. |
| 6,081,715 A | | 6/2000 | LaPorta et al. |
| 6,085,086 A | | 7/2000 | LaPorta et al. |
| 6,442,616 B1 | * | 8/2002 | Inoue et al. ............ 709/245 |

* cited by examiner

METHOD AND APPARATUS FOR COMMUNICATION CONTROL OF MOBILE COMPUTERS IN COMMUNICATION NETWORK SYSTEMS USING PRIVATE IP ADDRESSES

BACKGROUND OF THE INVENTION

1. Field of the Invention

The present invention relates to a method and an apparatus for communication control in a communication network system formed by a plurality of computers including mobile computers for communicating data with each other and providing necessary services over a plurality of interconnected networks, for the purpose of controlling accesses to mobile computers that are moving over the networks.

2. Description of the Background Art

In conjunction with the reduction of size and cost of a computer system and the progress of a network environment, the use of a computer system has been expanded to a variety of fields rapidly, and the transition from a centralized system to a distributed system is in progress. Moreover, in recent years, in addition to the advance and the improved performance of a computer system itself, the advance and spread of the computer network technology has enabled communications (such as electronic mails, electronic news, file transfer, etc.) with externals of one office or one organization, in addition to the sharing of resources (such as files, printers, etc.) within one office, which are now widely used. Particularly, in recent years, the use of the worldwide computer network called Internet has widely spread, and there are new computer businesses for supporting connections to the Internet for the purpose of utilizing opened information and services or for providing information and services to external users accessing through the Internet. Furthermore, developments of many new technologies concerning the use of the Internet are currently in progress.

In addition, in conjunction with such a spread of the computer network, developments of technologies concerning mobile computing are also currently in progress. In the mobile computing, a user can make communications by using a portable terminal or computer while moving over the networks. There are even cases in which a location on the networks is changed while being in a communication, so that there is a need for a scheme to manage addresses of mobile computers on the networks which are changing during communications in order to properly deliver communication contents to the mobile computers.

On the other hand, as the computer networks spread and free connections among the networks are realized so that enormous amount of data and services are to be communicated through the networks, there arises a need to account for the problems of security. For example, it is necessary to account for a problem as to how to prevent a leakage of secret information of an organization to the external network, or a problem as to how to protect resources and information associated with an organization's network from illegal accesses from externals of an organization. The Internet was originally constructed for the academic purposes so that it was primarily concerned with the realization of free communications of data and services by network connections and the problems of security were not taken into account. However, recently, many commercial companies and groups are being connected to the Internet so that there has been a need for a mechanism to protect own organization's network in view of the problems of security.

To this end, in a case of connection a plurality of networks, it is common to provide a mechanism called firewall which monitors and checks data communicated through these networks for the purpose of preventing the illegal accesses from externals and the leakage of internal data to externals. By providing the firewall, it becomes possible to prevent the illegal accesses from externals and the leakage of secret information to externals, while enabling internal computers to receive external services safely.

Also, in a case of communicating important data with particularly high secrecy through external networks, there is a scheme for encrypting data contents before transmitting data packets to the external and decrypting received data contents at a receiving side. According to this scheme, even if a third person at outside the organization spoofs the data packets on the external network, the data contents would not be leaked to that third person because the data contents are encrypted, so that it becomes possible to guarantee the safe communication.

In this regard, such encryption/decryption is possible between the networks which are protected (guarded) by the firewalls which support this encryption/decryption. In a case of an access to the mobile computer described above, when the mobile computer moves to a network managed by the same organization which is managing the home network of the mobile computer and the this visited network is guarded by the firewall which supports the encryption/decryption, the encryption/decryption can be carried out similarly as in a case of communication between the computers within the same network. In such a case, for the purpose of addressing computers, it suffices to use the private addresses within that organization.

On the other hand, when the mobile computer moves to a network managed by an external organization or a network which is managed by the own organization but not guarded by the firewall, this mobile computer has to be treated as an external computer. Consequently, the encryption/decryption cannot be carried out, and the private address within that organization cannot be used within the external organization so that a totally different way of addressing this mobile computer will be necessary.

However, the conventional mobile computing scheme is not provided with a processing for changing the address according to a current location of the mobile computer. In the conventional mobile computing scheme, external addresses which are unique over all networks are given to all mobile computers, and the access to the mobile computer is realized by managing a table of correspondence between addresses (private addresses) within the own organization and external addresses.

This conventional mobile computing scheme has a problem in that, in general, there is only a limited number of addresses which are unique over the external networks (Internet), and it is expected that a number of available external addresses will be insufficient for allocation to all the mobile computers when the mobile computers become popular.

SUMMARY OF THE INVENTION

It is therefore an object of the present invention to provide a method and an apparatus for communication control in a communication network system using a mobile computer, capable of realizing flexible address control and management for the mobile computer regardless of a location of the mobile computer in the communication network system.

According to one aspect of the present invention there is provided a method for controlling communications in a communication network system formed by a plurality of computers for communicating data with each other through a plurality of interconnected networks, said plurality of computers including at least one mobile computer for communicating data while changing a location in the communication network system, the method comprising the steps of: (a) when the mobile computer is located within a home network of the mobile computer, carrying out a communication with the mobile computer by transferring communication data using a first location identifier specific to the mobile computer which is uniquely defined within own organization networks of the mobile computer; (b) when the mobile computer is located within an external own organization network, carrying out a communication with the mobile computer by routing communication data to the external own organization network using a third location identifier indicating a current visited location of the mobile computer in the communication network system which is uniquely defined over all the networks, and addressing the mobile computer within the external own organization network using the first location identifier; and (c) when the mobile computer is located within an external other organization network, carrying out a communication with the mobile computer by routing communication data to the external other organization network using the third location identifier, and addressing the mobile computer within the external other organization network using a second location identifier assigned to the mobile computer at a time of moving outside the own organization networks which is uniquely defined over all the networks.

According to another aspect of the present invention there is provided a relay device for relaying communication data in a communication network system formed by a plurality of computers for communicating data with each other through a plurality of interconnected networks, said plurality of computers including at least one mobile computer for communicating data while changing a location in the communication network system, the relay device being provided in a home network of the mobile computer and comprising: management means for managing the address information for the mobile computer within own organization networks of the mobile computer, the address information containing a corresponding set of a first location identifier, a second location identifier and a third location identifier, the first location identifier being a location identifier specific to the mobile computer which is uniquely defined within the own organization networks, the second location identifier being a location identifier reserved for the mobile computer which is uniquely defined over all the networks, and the third location identifier being a location identifier indicating a current visited location of the mobile computer in the communication network system which is uniquely defined over all the networks; and processing means for obtaining the third location identifier corresponding to the first location identifier or the second location identifier of a destination computer attached to communication data transmitted from a source according to the address information, and transferring the communication data by attaching the obtained third location identifier to the destination computer.

According to another aspect of the present invention there is provided a data packet processing device for processing communication data in a communication network system formed by a plurality of computers for communicating data with each other through a plurality of interconnected networks, said plurality of computers including at least one mobile computer for communicating data while changing a location in the communication network system, the data packet processing device being provided in a home network of the mobile computer and comprising: management means for managing an address information for the mobile computer within own organization networks of the mobile computer, the address information containing a corresponding set of a first location identifier, a second location identifier and a third location identifier, the first location identifier being a location identifier specific to the mobile computer which is uniquely defined within the own organization networks, the second location identifier being a location identifier reserved for the mobile computer which is uniquely defined over all the networks, and the third location identifier being a location identifier indicating a current visited location of the mobile computer in the communication network system which is uniquely defined over all the networks; and processing means for receiving communication data transmitted from a relay device provided in the home network of the mobile computer which is encapsulated using the third location identifier corresponding to the first location identifier, then decapsulating the communication data using the third location identifier, then encapsulating the communication data using the second location identifier corresponding to the third location identifier, then encapsulating the communication data using the third location identifier, and then transmitting the communication data to an external other organization network, when the mobile computer is located within the external other organization network and the communication data has a destination specified by the first location identifier.

Other features and advantages of the present invention will become apparent from the following description taken in conjunction with the accompanying drawings.

DETAILED DESCRIPTION OF THE PREFERRED EMBODIMENTS

Figure 1:
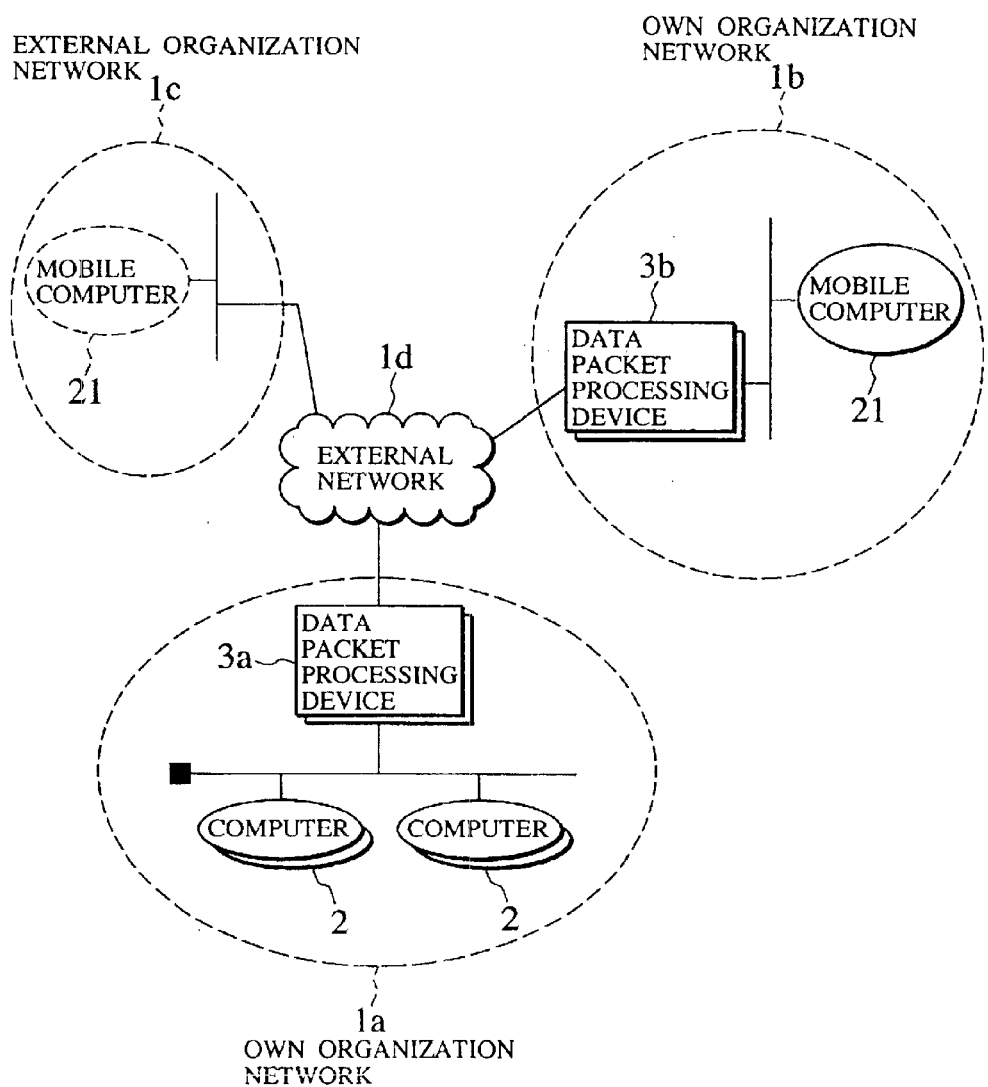
FIG. 1 is a block diagram of a basic configuration of a communication network system according to the present invention.
Figure 2:
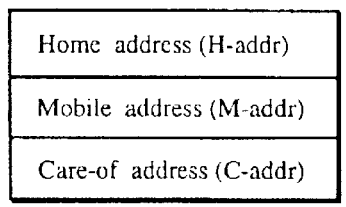
FIG. 2 is an illustration of a basic data content of a location identifier memory unit according to the present invention.

Referring now to FIG. 1 and FIG. 2, the basic features of a method and an apparatus of communication control according to the present invention will be summarized first.

FIG. 1 shows a basic configuration of a communication network system according to the present invention.

This communication network system of FIG. 1 includes an own organization network 1a, an externally located own organization network 1b, and an external organization network 1c which are interconnected through an external network 1d, and a mobile host computer 21 whose home network is the own organization network 1a. In the following, a case where this mobile host computer 21 moves to the externally located own organization network 1b and a case where this mobile host computer 21 moves to the external organization network 1c will be considered.

The own organization networks 1a and 1b are equipped with data packet processing devices 3a and 3b, respectively, for realizing a secret communication (such as a cipher communication) to conceal data contents to be communicated between computers managed under these networks, so as to realize a secret communication between hosts managed by the own organization.

FIG. 2 shows a basic data content of a location identifier memory unit for storing three types of location identifiers (addresses) used in the communication control method of the present invention. More specifically, this location identifier memory unit of FIG. 2 is given in a form of a table concatenating three types of addresses, including H-addr (home address), M-addr (mobile address) and C-addr (care-of address). The H-addr is an address specific to the mobile computer 21 which is uniquely defined within the own organization networks. The M-addr is an address reserved for the mobile computer 21 which is uniquely defined over all the networks. The C-addr is an address indicating a current visited location of the mobile computer 21 in the communication network system which is uniquely defined over all the networks. Note that, as will be described below, it is also possible to store the above described table by concatenating some other information defined according to the mobile computing protocol.

The above described table containing three types of location identifiers can be provided at various locations depending on the system configuration, such as at hosts, gateways, routers, etc., provided in the communication network system. The embodiments described below will be directed to an exemplary case in which each of the data packet processing devices 3a and 3b has the above described table containing three types of location identifiers.

Now, in general, the Internet gives only a limited number of unique IP addresses (Internet addresses) to one organization. However, it is necessary for each organization to support many hosts. For this reason, usually, the Internet addresses are allocated only to the gateway computers which actually communicate data with the externals, and the private addresses which are independently defined within that organization are allocated to the other host computers.

In the network system configuration of FIG. 1, all the computers within the own organization networks 1a and 1b are assigned with the private addresses of the own organization. Here, the private addresses of the own organization network 1a are assigned not only to the computers 2 which are connected at their home locations, but also to the mobile host computer 21 before it moves. This private address corresponds to the H-addr of the three address set described above. Every host within the own organization has its private address so that, even when the mobile host computer 21 moves to the network 1b, the addressing using the private address (H-addr) is possible as long as it is possible to enter this visited network 1b by using an address (corresponding to the C-addr of the three address set described above) for indicating a location of this visited network 1b in the communication network system.

On the other hand, when the mobile host computer 21 moves to the external organization network 1c, the private address of the own organization cannot be used at the external organization, so that the routing with respect to the mobile host computer 21 located in this network 1c cannot be made by means of the private address. The M-addr of the three address set described above is an address to be used in such a situation. In general, the M-addr is one address selected from a group of Internet addresses which are reserved for the mobile hosts. By using the M-addr, it is possible to realize the unique routing over the entire Internet even when the mobile host computer 21 moves to the external organization network 1c.

As described, in the present invention, an address to be used for the purpose of accessing the mobile host computer is selectively switched among three types of addresses stored in the location identifier memory unit of FIG. 2 according to a current location of the mobile host computer and the mobile computing protocol to be used.

In other words, the basic policy of the communication control according to the present invention is as follows. In a case of communicating with the mobile host located in the external other organization network, the C-addr should be used for the purpose of routing to the external other organization network, and the M-addr should be used for the purpose of addressing of the mobile host within the external other organization network. In a case of communicating with the mobile host located in the externally located own organization network, the C-addr should be used for the purpose of routing to the external own organization network, and the H-addr should be used for the purpose of addressing of the mobile host within the external own organization network. In a case of communication with the mobile host located in the own organization network (internal net), the H-addr should be used for the purpose of addressing of the mobile host within the own organization network. This basic policy can be applied to various types of already proposed mobile computing protocols, with some additional rules necessary for the actual operation according to each specific mobile computing protocol.

In the following, two specific embodiments of the present invention will be described, for exemplary cases of two major currently proposed mobile computing protocols, that is, IETF/Mobile-IP (see, C. Perkins, "IP Mobility Support", Internet Draft draft-ietf-mobileip-protocol-17.txt, May 1996) and VIP (see F. Teraoka et al., "VIP: A Protocol Providing Host Mobility, Communications of ACM. Vol. 37, No. 8, pp. 67–75, August 1994).

First, with references to FIG. 3 to FIG. 11, the first specific embodiment of the present invention for a case of IETF/Mobile-IP (which will be abbreviated hereafter as MIP) will be described in detail.

Figure 3:
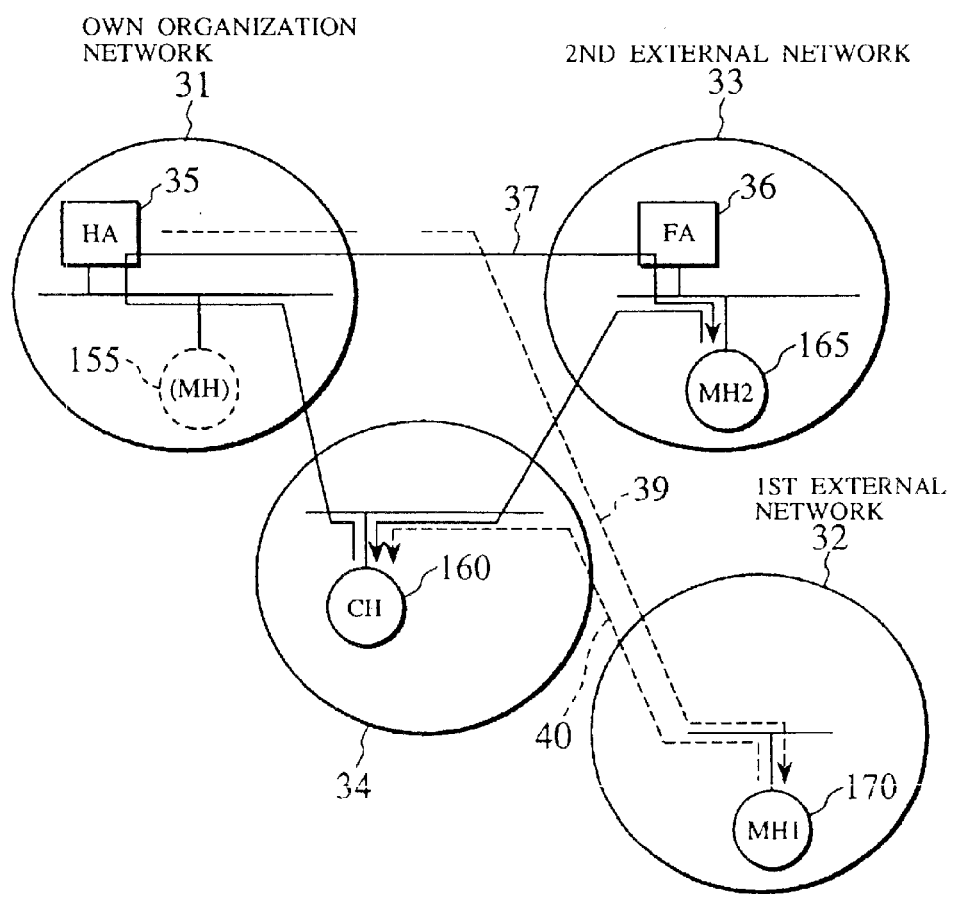
FIG. 3 is a schematic block diagram of an exemplary communication network system for explaining the mobile computing protocol IETF/Mobile-IP (MIP) utilized in the first specific embodiment of the present invention.

As shown in FIG. 3, the MIP uses a mobile host MH (155 of FIG. 3), a foreign agent FA (36 of FIG. 3), a home agent HA (35 of FIG. 3), and a correspondent host CH (160 of FIG. 3). Note that the external network for interconnecting the networks 31, 32 33 and 34 is not depicted in FIG. 3 for the sake of simplicity. The foreign agent FA is managing a mobile host MH which has moved into a scope of its management. The data destined to the mobile host MH which is transmitted from the correspondent host CH is sent to the home agent HA once, and then transferred to the mobile host MH via the foreign agent FA as indicated by an arrow 37 in FIG. 3.

In addition to the FA utilization mode (a case of MH2 165 shown in FIG. 3) which realizes the communication by using the foreign agent FA as described above, the MIP also provides a pop-up mode (a case of MH1 170 shown in FIG. 3) which realizes the communication as the mobile host MH obtains the network layer Internet address (see R. Droms, "Dynamic Host Configuration Protocol", IEFT-RFC 1541, October 1993).

Figure 4:
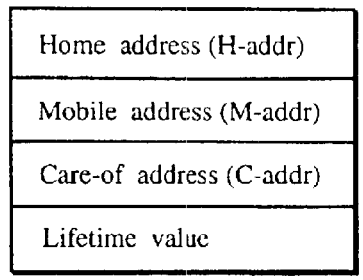
FIG. 4 is an illustration of an exemplary data content of a location identifier memory unit according to the first specific embodiment of the present invention.

FIG. 4 shows an exemplary data content of the location identifier memory unit in a case of applying the communication control method of the present invention to the MIP. In the MIP, the registered information for each mobile host MH is managed by attaching a lifetime (a valid period of the information). Here, this management is realized by attaching a field for indicating this lifetime to the location identifier memory unit described above.

In a case of applying the communication control method of the present invention to the MIP, a correspondence table indicating a correspondence between H-addr and C-addr and including lifetime is to be provided within the home agent HA and within each foreign agent FA (for a case of FA utilization mode), while the location identifier memory unit as shown in FIG. 4 is to be provided at the data packet processing devices (3a and 3b shown in FIG. 1) on the network system. By using them, the MIP control and the communication control with respect to the mobile host can be carried out as follows.

In the following, the operations in the MIP will be described for two cases of the FA utilization mode and the pop-up mode.

(1) Registration in MIP:

The mobile host MH which moves outside the home network issues a "registration request" message to the home agent HA in order to carry out the registration.

In the FA utilization mode, the "registration request" message is sent via the foreign agent FA by attaching an address of the foreign agent FA to the C-addr portion within the message.

In the pop-up mode, the Internet address obtained by the mobile host MH at a visited network is set to the C-addr portion within the message.

When the "registration request" message is received, the home agent HA returns a "confirmation" response if it is possible to accept that request. For example, the message source computer is authenticated by checking the signature information in the message as given by the mobile host MH, and a new registration is carried out when the authentication is successful.

If is it not possible to accept that request, an appropriate response corresponding to the reason for refusal such as "authentication failure" in a case where the authentication failed, "invalid", or "registration denied", is returned to the mobile host MH. in a case of returning the "confirmation" response, the three address set is registered into a table within the home agent HA. Note that, in the FA utilization mode, the foreign agent FA also holds and manages the three address set.

(2) Keep-alive in MIP:

The mobile host MH carries out the re-registration called "keep-alive" at a period shorter than the lifetime advertised by the home agent HA and the foreign agent FA.

A value of the lifetime for the three address set information registered at the home agent HA and the foreign agent FA is rest to the initial value upon this re-registration.

(3) Deregistration in MIP:

In a case of carrying out the deregistration, the mobile host MH directly sends the "deregistration request" message to the home agent HA.

The home agent HA then notifies success/failure of the deregistration request to the mobile host MH, while invalidating the corresponding three address set.

In a case of the FA utilization mode, no message is sent to the foreign agent FA, but the invalidation at the foreign agent FA automatically takes place according to the lifetime. Note however that, it is also possible to send some message from the home agent HA to the foreign agent FA depending on the system requirements.

(4) Move in MIP:

When the mobile host MH which already completed the registration of (1) further moves, the re-registration by "keep-alive" of (2) is carried out at appropriate interval.

In the FA utilization mode, when the foreign agent FA which manages the mobile host MH is changed due to the move, a new FA address is overwritten at the C-addr portion of the message in conjunction with the "keep-alive" message. Subsequently, the communication can be continued by using the re-registered three address set.

Note that, in the pop-up mode, the re-registration procedure is unnecessary because the address does not change. However, the operation in a case of changing the address by re-acquiring it in the pop-up mode is the same as the case where the FA is changed in the FA utilization mode.

(5) Data Communication in MIP:

Next, the data communication method in the MIP will be described. In principle, the addressing to the mobile host MH is carried out by using the H-addr within the same organization in which the private addresses are shared, and by using the M-addr with respect to the mobile host MH located in the other external organization.

First, a case of the FA utilization mode will be described.

Figure 5:
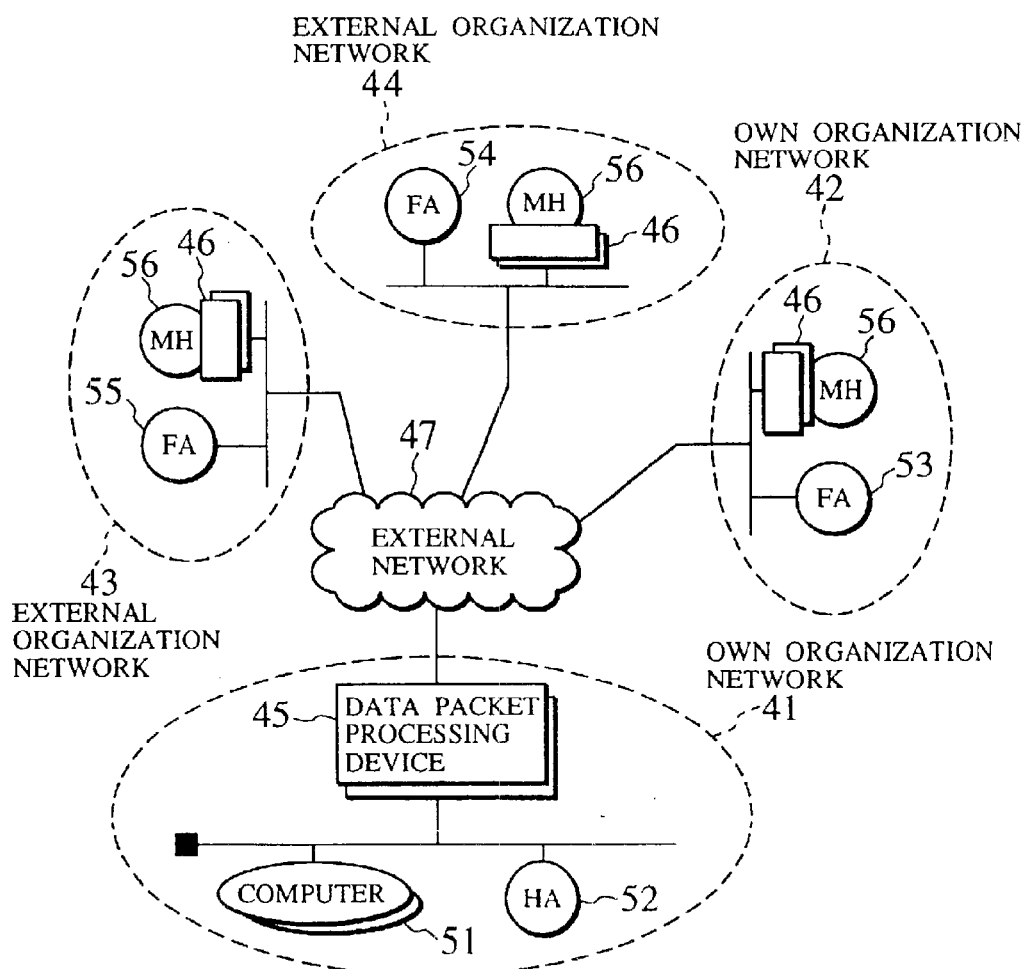
FIG. 5 is a block diagram of an exemplary communication network system for the FA utilization mode of the MIP according to the first specific embodiment of the present invention.

FIG. 5 shows an exemplary configuration of the network system in the FA utilization mode. The own organization network 41 is the home network to which the mobile host MH was originally connected. The externally located own organization network 42 is managed under the same organization as the own organization network 41, and it is assumed that the unique addressing of the hosts using the common private addresses (H-addr) is possible among them. The networks 43 and 44 are external organization networks. Also, the data packet processing devices 45 and 46 are provided at an exit of the network 41 and in association with the mobile host MH, respectively, and it is assumed that they are supporting the secret communication (cipher communication). Note that, in FIG. 5, a device having the FA function within the own organization network 41 in the FA utilization mode is not depicted for the same of simplicity.

In the FA utilization mode, the communication directed from the mobile host MH to the correspondent host CH is directly routed to the correspondent host CH. Also, the communication directed from the correspondent host CH to the mobile host MH is sent to the host agent HA, transferred to the foreign agent FA which manages the mobile host MH at that point, and sent from that foreign agent FA to the mobile host MH.

Now, with references to the flow charts of FIG. 6 to FIG. 8, the operations in the FA utilization mode will be explained in detail, for cases of different relationships between locations of the correspondent host CH and the mobile host MH.

Here, the possible relationships between locations of the correspondent host CH and the mobile host MH include the following ten cases.

Case1 is a case in which the correspondent host CH is located in the network 41 and the mobile host MH is located in the network 41.

Case2 is a case in which the correspondent host CH is located in the network 41 and the mobile host MH is located in the network 42.

Case3 is a case in which the correspondent host CH is located in the network 41 and the mobile host MH is located in the network 43.

Case4 is a case in which the correspondent host CH is located in the network 42 and the mobile host MH is located in the network 41.

Case5 is a case in which the correspondent host CH is located in the network 42 and the mobile host MH is located in the network 42.

Case6 is a case in which the correspondent host CH is located in the network 42 and the mobile host MH is located in the network 43.

Case7 is a case in which the correspondent host CH is located in the network 43 and the mobile host MH is located in the network 41.

Case8 is a case in which the correspondent host CH is located in the network 43 and the mobile host MH is located in the network 42.

Case9 is a case in which the correspondent host CH is located in the network 43 and the mobile host MH is located in the network 43.

Case10 is a case in which the correspondent host CH is located in the network 43 and the mobile host MH is located in the network 44.

Figure 6:
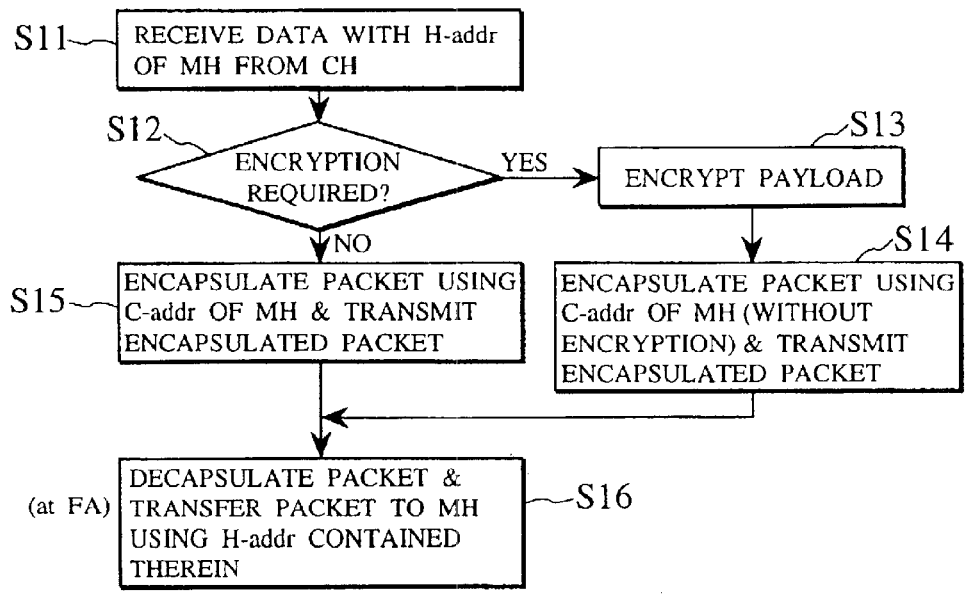
FIG. 6 is a flow chart for the operation in some cases of the FA utilization mode of the MIP according to the first specific embodiment of the present invention.

FIG. 6 is the flow chart for the operation in case1, case2, case4 and case5 described above.

Figure 7:
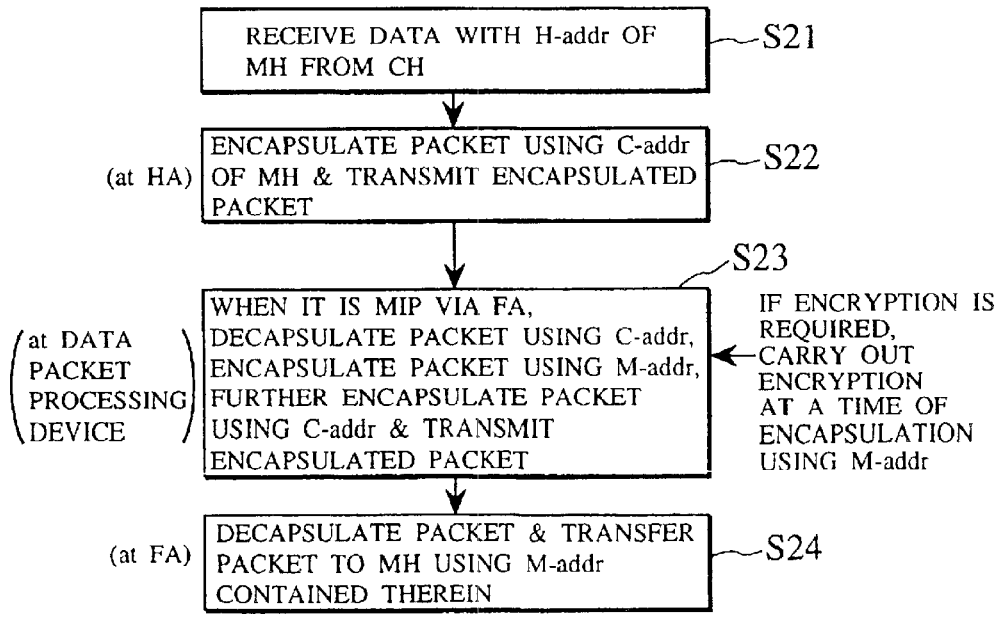
FIG. 7 is a flow chart for the operation in some other cases of the FA utilization mode of the MIP according to the first specific embodiment of the present invention.

FIG. 7 is the flow chart for the operation in case3 and case6 described above.

Figure 8:
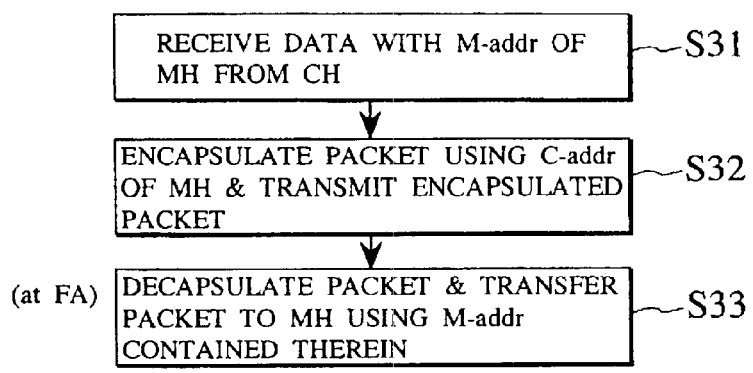
FIG. 8 is a flow chart for the operation in some other cases of the FA utilization mode of the MIP according to the first specific embodiment of the present invention.

FIG. 8 is the flow chart for the operation in case7 to case10 described above.

(Case1, Case2)

In case1 and case2, the correspondent host CH transmits the data packet by attaching the H-addr of the mobile host MH. As a result, this data packet reaches to the home agent HA. When this data packet with the H-addr of the mobile host MH is received from the correspondent host CH (step S11), if the secret communication is required (step S12 YES), the payload of this packet is encrypted (by the data packet processing device 45 at step S13). Then, this data packet is encapsulated using the C-addr (the FA address in the network at which the mobile host MH is located) corresponding to the H-addr of the mobile host MH and the encapsulated packet is transmitted (by the data packet processing device 45 at step S14 in a case where step S12 is YES, or by the home agent HA at step S15 in a case where step S12 is NO). As a result, this packet is transferred to the foreign agent FA. Then, at the foreign agent FA, this packet is decapsulated and transferred to the mobile host MH by using the H-addr contained therein (step S16).

In a case of carrying out the secret communication, the encryption is carried out by the data packet processing device 45 at the step S13. Here, since the foreign agent FA cannot decrypt the encrypted data, the encapsulation using the C-addr at the step S14 should be the encapsulation without encryption which will be described below.

Note that, in case1, if the mobile host MH and the correspondent host CH are located on the same link, the direct communication using the H-addr is possible between them.

(Case3)

In case3, the correspondent host CH transmits the data packet by attaching the H-addr of the mobile host MH. As a result, this data packet reaches to the home agent HA. When this data packet with the H-addr of the mobile host MH is received from the correspondent host CH (step S21), the home agent HA encapsulates this data packet using the C-addr (the FA address in the network 43) corresponding to the H-addr of the mobile host MH and transmits the encapsulated packet (step S22). As a result, this packet is transferred to the foreign agent FA. At this point, when the data packet processing device 45 detects that it is the MIP via FA in a course of transfer, the data packet processing device 45 decapsulates this packet using the C-addr, encapsulates this packet using the found M-addr further encapsulates this packet using the C-addr, and transmits this encapsulated packet (step S23). Then, at the foreign agent FA, this packet is decapsulated and transferred to the mobile host MH by using the M-addr contained therein (step S24). Here, the H-addr cannot be used because the network 43 is the external organization network.

In a case of carrying out the secret communication, the encryption is carried out at a time of the encapsulation using the M-addr by the data packet processing device 45.

It is also possible to use the following procedure instead.

Namely, the correspondent host CH transmits the data packet by attaching the H-addr of the mobile host MH. As a result, this data packet reaches to the home agent HA. When this data packet with the H-addr of the mobile host MH is received from the correspondent host CH, the home agent HA replaces this H-addr of the mobile host MH by the corresponding M-addr, and then encapsulates this data packet using the C-addr (the FA address in the network 43) corresponding to the H-addr of the mobile host MH and transmits the encapsulated packet. As a result, this packet is transferred to the foreign agent FA. Then, at the foreign agent FA, this packet is decapsulated and transferred to the mobile host MH by using the M-addr contained therein.

In a case of carrying out the secret communication, the encryption is carried out by the data packet processing device 45. Here, since the foreign agent FA cannot decrypt the encrypted data, the encapsulation using the C-addr should be the encapsulation without encryption which will be described below.

(Case4)

In case4, the processing similar to that of case2 described above is carried out. If the data packet processing device is provided at the network 42, the secret communication can be carried out similarly as in case2.

(Case5)

In case5, the processing similar to that of case2 described above is carried out.

(Case6)

In case6, the processing similar to that of case3 described above is carried out. If the data packet processing device is provided at the network 42, the secret communication can be carried out similarly as in case3.

(Case7 to Case10)

In case7 to case10, the correspondent host CH is located in the network 43 at which the data packet processing device is not provided, so that the secret communication is not to be carried out. Also, the correspondent host CH is located in the external organization network, so that the correspondent host CH does not know the H-addr of the mobile host MH unlike the previous cases.

In case7 to case10, the correspondent host CH transmits the data packet by attaching the M-addr of the mobile host MH. As a result, this data packet reaches to the data packet processing device 45 of the network 41. When this data packet with the M-addr of the mobile host MH is received from the correspondent host CH (step S31), the data packet processing device 45 retrieves the three address set of the mobile host MH, and then encapsulates this data packet using the C-addr corresponding to the M-addr of the mobile host MH and transmits the encapsulated packet (step S32). As a result, this packet is transferred to the foreign agent FA. Then, at the foreign agent FA, this packet is decapsulated and transferred to the mobile host MH by using the M-addr contained therein (step S33).

Note that, in case7, if the mobile host MH and the data packet processing device 45 are located on the same link, it is possible to set the C-addr of the mobile host MH identical to the H-addr, and when this C-addr identical to the H-addr is detected, this packet can be directly transferred to the mobile host MH without the encapsulation and the transfer to the foreign agent FA.

Note also that the above description is directed to a processing in a case where the correspondent host CH transfers data to the mobile host MH via the home agent HA, but the similar description also applies to the data transfer in the opposite direction from the mobile host MH to the correspondent host CH as well, so that it is necessary to change the source address of the packet to be transmitted from the mobile host MH to H-addr or M-addr according to a manner of addressing the correspondent host CH.

First, in a case where the correspondent host CH is located in the external network (case7 to case10), the mobile host MH uses its own M-addr as the source address. This is because the routing cannot be made in a case where a response message is to be returned, for example, unless the global M-addr is used.

Here, however, the packet with M-addr attached thereto cannot be used within the own organization in a case where the mobile host MH is located in the private address region (case7 and case8). In such a case, H-addr is used as the source address first so that the packet reaches up to the data packet processing device, then H-addr is replaced by the corresponding M-addr at the data packet processing device and the packet is transferred further to the correspondent host CH.

On the other hand, in a case where the correspondent host CH is located in the private region while the mobile host MH is located in the external network (case3 and case6), the packet with H-addr as the source address is encapsulated using M-addr and then transmitted so that the packet reaches up to the data packet processing device of the network at which the correspondent host CH is located. Then, the packet is decapsulated using M-addr at the data packet processing device and transferred further to the correspondent host CH.

Next, with references to the flow charts of FIG. 9 and FIG. 10, the operations in the pop-up mode will be explained in detail, for the above described case1 to case10.

Figure 9:
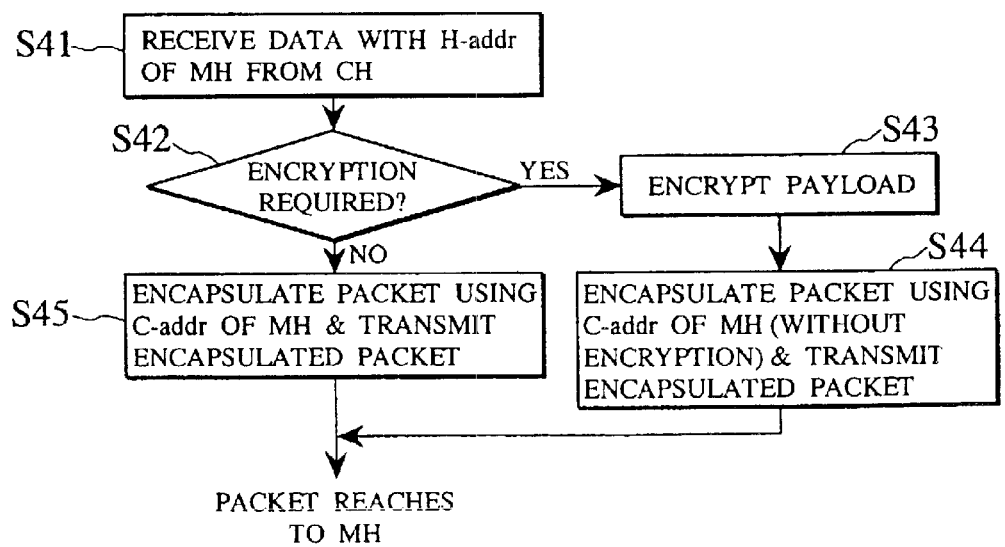
FIG. 9 is a flow chart for the operation in some cases of the pop-up mode of the MIP according to the first specific embodiment of the present invention.

FIG. 9 is the flow chart for the operation in case1 to case6 described above.

Figure 10:
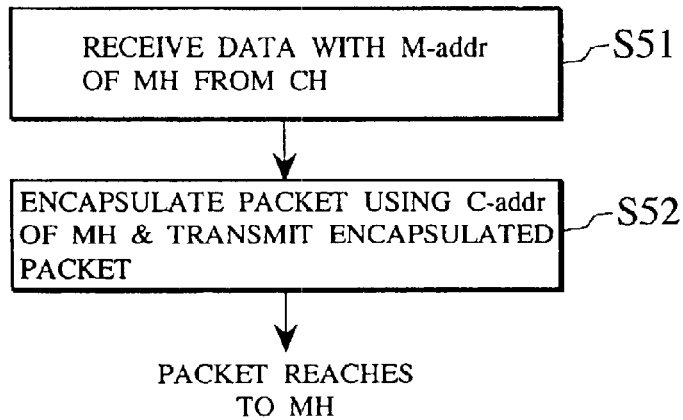
FIG. 10 is a flow chart for the operation in some other cases of the pop-up mode of the MIP according to the first specific embodiment of the present invention.

FIG. 10 is the flow chart for the operation in case7 to case10 described above.

(Case1 to Case3)

In case1 to case3, the correspondent host CH transmits the data packet by attaching the H-addr of the mobile host MH. As a result, this data packet reaches to the home agent HA. When this data packet with the H-addr of the mobile host MH is received from the correspondent host CH (step S41), if the secret communication is required (step S42 YES), the payload of this packet is encrypted (by the data packet processing device 45 at step S43). Then, this data packet is encapsulated using the C-addr (the address of the mobile host MH) corresponding to the H-addr of the mobile host MH and the encapsulated packet is transmitted (by the data packet processing device 45 at step S44 in a case where step S42 is YES or by the home agent HA at step S45 in a case where step S42 is NO). As a result, this packet is transferred to the mobile host MH. Here, the encapsulation using the C-addr at the step S44 should be the encapsulation without encryption which will be described below.

In a case of carrying out the secret communication, the data packet processing device 45 decapsulates this packet using the C-addr once and encrypts the decapsulated packet, and then encapsulates the encrypted packet using the C-addr again and transmits the encapsulated packet at the steps S43 and S44.

Note that, in case1, if the mobile host MH and the correspondent host CH are located on the same link, the direct communication using the H-addr is possible between them.

(Case4)

In case4, the processing similar to that of case2 described above is carried out. If the data packet processing device is provided at the network 42, the secret communication can be carried out similarly as in case2.

(Case5)

In case5, the processing similar to that of case2 described above is carried out.

(Case6)

In case6, the processing similar to that of case3 described above is carried out. If the data packet processing device is provided at the network 42, the secret communication can be carried out similarly as in case3.

(Case7 to Case10)

In case7 to case10, the correspondent host CH is located in the network 43 at which the data packet processing device is not provided, so that the secret communication is not to be carried out. Also, the correspondent host CH is located in the external organization network, so that the correspondent host CH does not know the H-addr of the mobile host MH unlike the previous cases.

In case7 to case10, the correspondent host CH transmits the data packet by attaching the M-addr of the mobile host MH. As a result, this data packet reaches to the data packet processing device 45 of the network 41. When this data packet with the M-addr of the mobile host MH is received from the correspondent host CH (step S51), the data packet processing device 45 retrieves the three address set of the mobile host MH, and then encapsulates this data packet using the C-addr corresponding to the M-addr of the mobile host MH and transmits the encapsulated packet (step S52). As a result, this packet is transferred to the mobile host MH.

Note that, in case7, if the mobile host MH and the data packet processing device 45 are located on the same link, it is possible to set the C-addr of the mobile host MH identical to the H-addr, and when this C-addr identical to the H-addr is detected, this packet can be directly transferred to the mobile host MH without the encapsulation.

Figure 11:
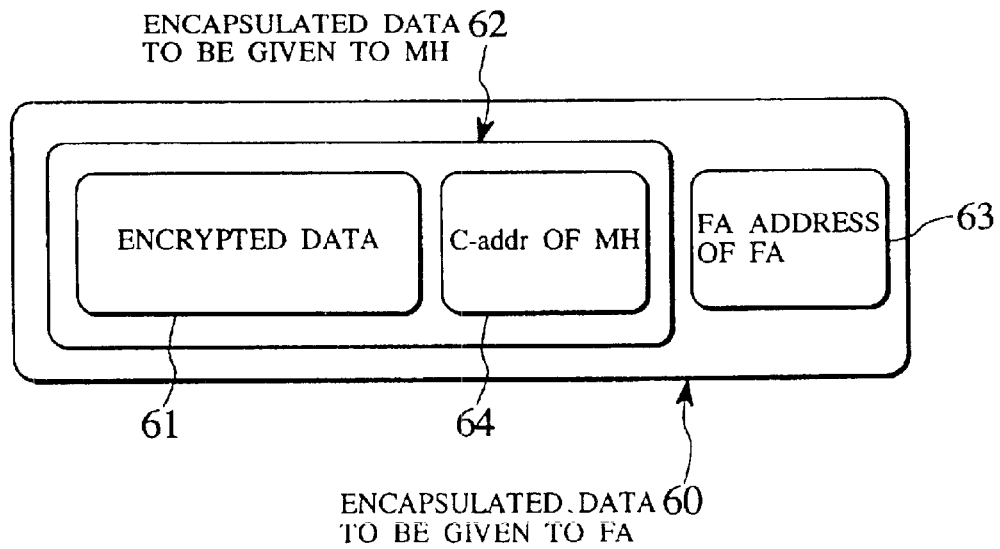
FIG. 11 is an illustration of an encapsulated data obtained by an encapsulation without encryption according to the first specific embodiment of the present invention.

In the above description, the encapsulation without encryption refers to the following. Namely, in a case of transmitting the encrypted data via the foreign agent FA, the foreign agent FA is not necessarily a computer belonging to the own organization, so that the foreign agent FA may not be able to decrypt the encrypted data. Consequently, for the data content to be transmitted via the foreign agent FA, it is necessary to carry out the processing to obtain the encapsulated data 60 as shown in FIG. 11. Namely, in this processing, the data content is encrypted to obtain the encrypted data 61 and encapsulated by attaching the C-addr of the mobile host MH 64 to obtain the encapsulated data 62 to be given to the mobile host MH. Then, this encapsulated data 62 is further encapsulated without encryption by attaching the FA address of the foreign agent FA 63 to obtain the encapsulated data 60 and this encapsulated data 60 is transmitted to the foreign agent FA.

As described, in a case of applying the communication control method of the present invention to the MIP, the C-addr registered in the location identifier memory unit is the address obtained by the mobile computer MH in the pop-up mode, or the address of the foreign agent FA in the FA utilization mode. Also, depending on whether the location of the correspondent host CH is in the own organization network or not, the address to be attached to the data packet by the correspondent host CH first is changed. Namely, the H-addr is attached when it is a message from the correspondent host CH located in the own organization network, or the M-addr is attached otherwise. Accordingly, the data packet is subsequently processed by retrieving the corresponding address set at each necessary home agent HA and data packet processing device.

Note that, in this first specific embodiment, the address information containing H-addr, M-addr and C-addr is used for the packet creation by the home agent HA, the data packet processing device of the home network, the foreign agent FA, and the correspondent host CH. Consequently, the address information can be provided at the home agent HA or the data packet processing device of the home network and its content can be managed and updated according to the registration message from the mobile node, or else the address information can be provided at the foreign agent FA and managed and manipulated by updating information when the mobile node visited the network of the foreign agent FA. As for the correspondent host CH, it is generally not known in advance which mobile computer is going to communicate with the correspondent host CH, so that the three address set information is to be obtained from the home agent HA or the data packet processing device within the home network of the mobile computer, or from a separately provided address information database within the home network of the mobile computer by means of an exchange of a request and a response.

As for a manner by which the mobile computer obtains M-addr, any of the following three schemes can be used.

(1) The home agent HA of the home network manages a plurality of M-addr, and assigns one of these plurality of M-addr to each mobile host MH which is moving out to the external network.

(2) The data packet processing device of the home network manages a plurality of M-addr, and assigns one of these plurality of M-addr to each mobile host MH which is moving out to the external network.

(3) The foreign agent of the visited network manages a plurality of M-addr, and assigns one of these plurality of M-addr to each visiting mobile host MH which requires a global address.

When the mobile computer obtains M-addr by any of the above three schemes, it is necessary to update all the address information provided in the entire network system by the latest information containing the obtained M-addr.

Next, with references to FIG. 12 to FIG. 16, the second specific embodiment of the present invention for a case of VIP will be described in detail.

Figure 12:
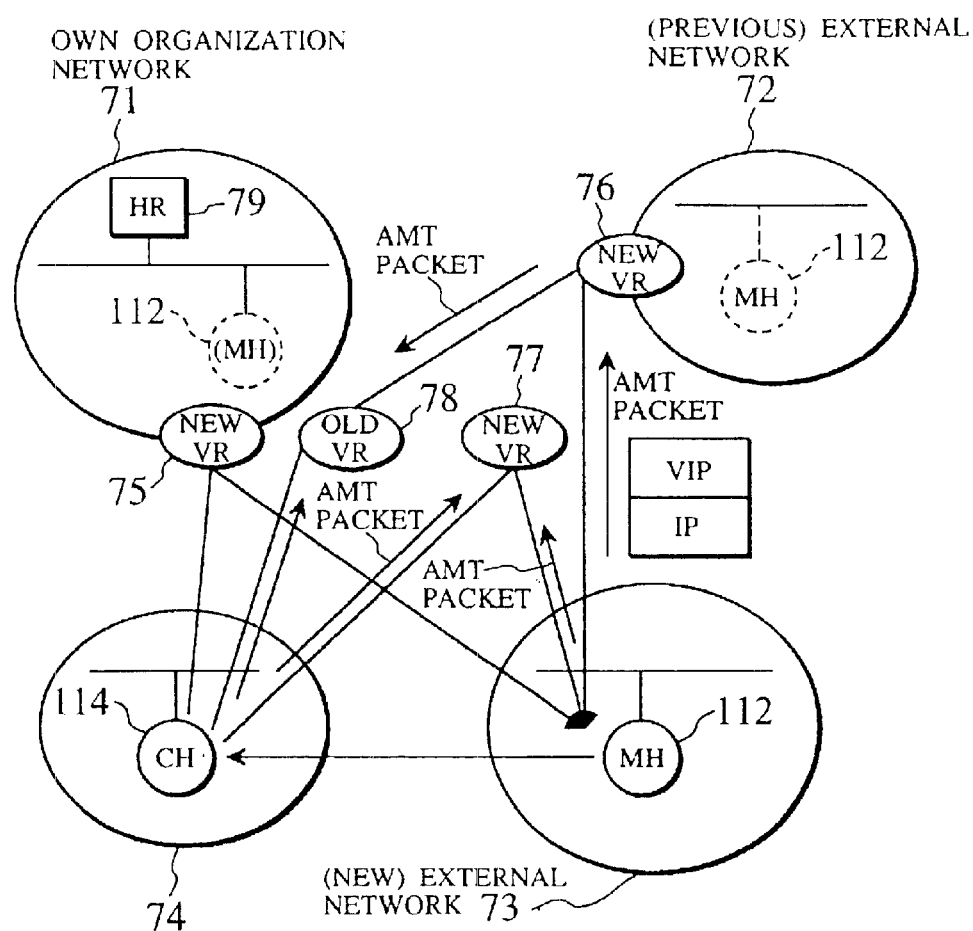
FIG. 12 is a schematic block diagram of an exemplary communication network system for explaining the mobile computing protocol VIP utilized in the second specific embodiment of the present invention.

The VIP is the mobile computing protocol proposed by Sony Computer Science Laboratory Inc. in the WIDE project of Japan, which is a scheme as illustrated in FIG. 12 in which an AMT (Address Mapping Table) information indicating a correspondence between a virtual IP address (VIP) and an actual IP address (corresponding to a physical location) of a mobile host MH (112 in FIG. 12) is transferred according to the need so that an information for routing up to the mobile host is sequentially updated.

Each VIP router (VR) handles an event such as move, deregistration, registration, etc. of the mobile host by receiving the AMT information and changing or updating a corresponding entry. Among the VIP routers, one which manages a sub-net at which the mobile host MH was located before move will be called a home router (HR).

Figure 13:
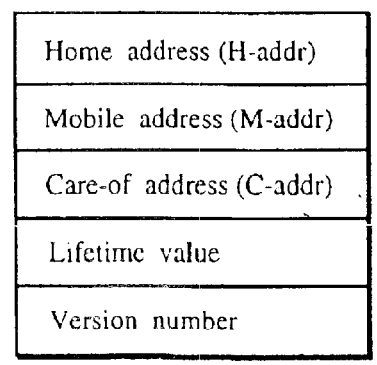
FIG. 13 is an illustration of an exemplary data content of a location identifier memory unit according to the second specific embodiment of the present invention.

FIG. 13 shows an exemplary configuration of the location identifier memory unit in a case of applying the communication control method of the present invention to the VIP. In the VIP, in addition to the lifetime (a valid period of the information) used in the MIP, it is necessary to manage a version number associated with the AMT information. In this embodiment, this management is realized by attaching fields for indicating a lifetime value and a version number to the location identifier memory unit described above. In the following description, it is assumed that this extended AMT entry information is held and managed by every VIP router.

In the VIP, similarly as in the pop-up mode of the MIP, the communication is realized as the mobile host MH obtains the network layer Internet address (see R. Droms, "Dynamic Host Configuration Protocol", IEFT-RFC1541, October 1993). In this case, a correspondence between a virtually defined VIP address and the internet address (IP address) obtained by the mobile host MH is propagated as the AMT information.

In a case of applying the communication control method of the present invention to the VIP, H-addr or M-addr is set in correspondence to the VIP address while C-addr is set in correspondence to the IP address, and the control and communication operations are, sequentially carried out according to them. It is assumed that a table containing three location identifiers of the present invention is held by every VIP router (or device for carrying out a corresponding operation) and every host.

In the following, the operations in the VIP will be described.

(1) Registration in VIP:

The mobile host MH which moves outside the home network issues an AMT creation message to the home router HR in order to carry out the registration. In the AMT creation message, the three address set and other necessary information are entered.

When the AMT creation message is received, the intermediate VIP router updates an information held in itself, and broadcasts the message within its sub-net.

The home router HR broadcasts the AMT entry (three address set) within the home sub-net. In addition, the home router HR erects a deletion prohibition bit (implemented as a bit field accompanying the table) of the AMT entry.

(2) Keep-alive in VIP:

The mobile host MH carries out the re-registration called "keep-alive" by re-transmitting the AMT creation message to the home router HR at a period shorter than the holding period of the AMT entry of the home router HR.

The home router HR then re-broadcasts the AMT entry within the home sub-net.

(3) Deregistration in VIP:

In a case of carrying out the deregistration, the mobile host MH sends an AMT invalidation message to the home router HR.

The host which received the AMT invalidation message then erects an invalid flag for the entry. When a packet corresponding to this invalidated entry passes through this host/router, the content of this packet is checked and the AMT invalidation message is sent to the host/router which made the address mapping for that packet.

(4) Move in VIP:

When the mobile host MH moves and is connected to a new network, the AMT creation message is re-transmitted to the home router HR.

When the AMT creation message is received at an intermediate router, the corresponding entry is updated.

When the AMT creation message reaches to the home router HR, this AMT entry is broadcast within the home sub-net, and the AMT creation message is also sent to the router of the network in which the mobile host MH was previously located.

The router of the network in which the mobile host MH was previously located rewrites its own AMT entry, and transfers the transmitted packet to a new AMT address by using the old AMT entry registered up until then, while sending the AMT invalidation message to the host/router which made the mapping of the invalidated AMT.

(5) Data Communication in VIP:

Next, the data communication method in the VIP will be described with reference to FIG. 14. In principle, the addressing to the mobile host MH is carried out by using the H-addr within the same organization in which the private addresses are shared, and by using the M-addr with respect to the mobile host MH located in the other external organization.

Figure 14:
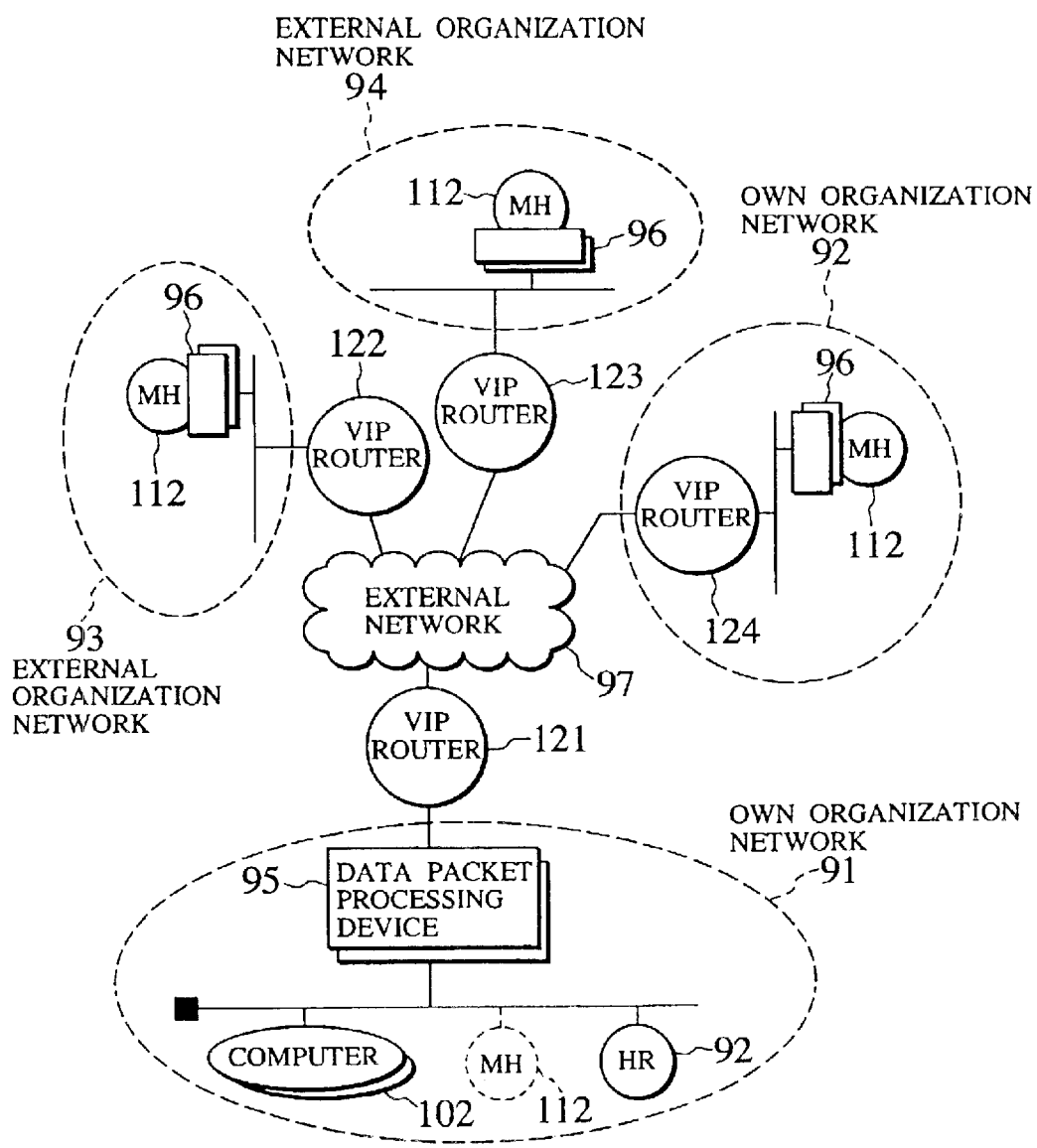
FIG. 14 is a block diagram of an exemplary communication network system for the VIP according to the second specific embodiment of the present invention.

FIG. 14 shows an exemplary configuration of the network system which supports the mobile computing using the VIP. The network 91 is the home network to which the mobile host MH was originally connected. The network 92 is the external network which is managed under the same organization as the network 91, and it is assumed that the unique addressing of the hosts using the common private addresses is possible among them. The networks 93 and 94 are external organization networks. Also, the data packet processing devices 95 and 96 are provided at an exit of the network 91 and in association with the mobile host MH, respectively, and it is assumed that they are supporting the secret communication (cipher communication).

Now, with references to the flow charts of FIG. 15 and FIG. 16, the operations in the VIP will be explained in detail, for cases of different relationships between locations of the correspondent host CH and the mobile host MH.

Here, the possible relationships between locations of the correspondent host CH (114 in FIG. 12) and the mobile host MH (112 in FIG. 12) include the following ten cases.

Case1 is a case in which the correspondent host CH is located in the network 91 and the mobile host MH is located in the network 91.

Case2 is a case in which the correspondent host CH is located in the network 91 and the mobile host MH is located in the network 92.

Case3 is a case in which the correspondent host CH is located in the network 91 and the mobile host MH is located in the network 93.

Case4 is a case in which the correspondent host CH is located in the network 92 and the mobile host MH is located in the network 91.

Case5 is a case in which the correspondent host CH is located in the network 92 and the mobile host MH is located in the network 92.

Case6 is a case in which the correspondent host CH is located in the network 92 and the mobile host MH is located in the network 93.

Case7 is a case in which the correspondent host CH is located in the network 93 and the mobile host MH is located in the network 91.

Case8 is a case in which the correspondent host CH is located in the network 93 and the mobile host MH is located in the network 92.

Case9 is a case in which the correspondent host CH is located in the network 93 and the mobile host MH is located in the network 93.

Case10 is a case in which the correspondent host CH is located in the network 93 and the mobile host MH is located in the network 94.

Figure 15:
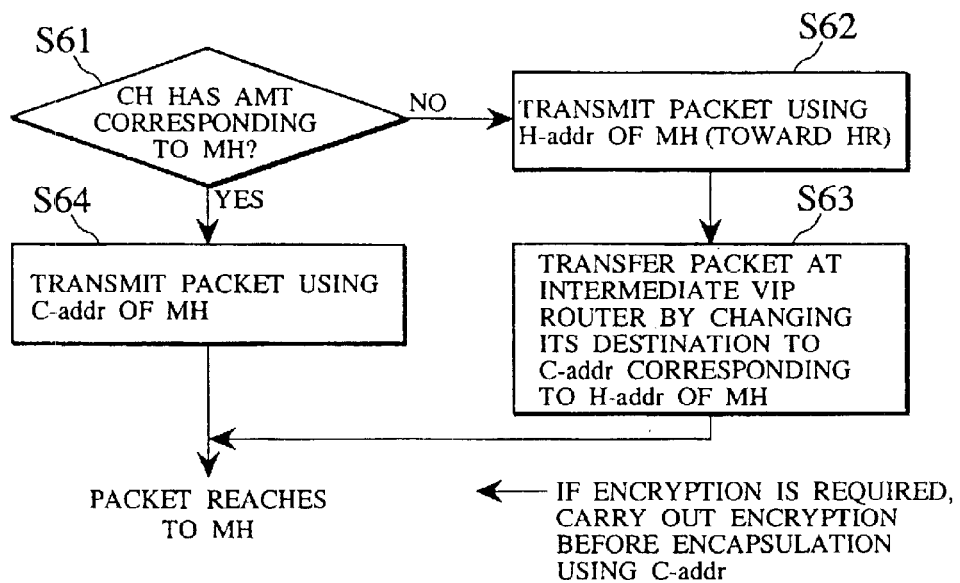
FIG. 15 is a flow chart for the operation in some cases of the VIP according to the second specific embodiment of the present invention.

FIG. 15 is the flow chart for the operation in case1 to case6 described above.

Figure 16:
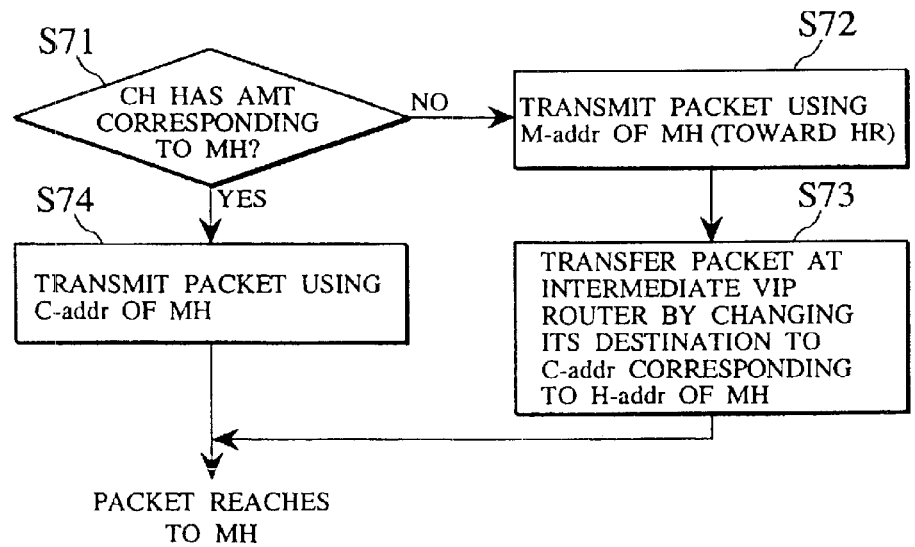
FIG. 16 is a flow chart for the operation in some other cases of the VIP according to the second specific embodiment of the present invention.

FIG. 16 is the flow chart for the operation in case7 to case10 described above.

(Case1 to Case3)

In case1 to case3, when the correspondent host CH has the AMT information corresponding to the mobile host MH (step S61 YES), the correspondent host CH transmits the packet by using the C-addr of the mobile host MH as a destination (step S64).

On the other hand, when the correspondent host CH does not have the AMT information corresponding to the mobile host MH (step S61 NO), the correspondent host CH transmits the packet by using the H-addr of the mobile host MH as a destination (step S62). In this case, the packet is transmitted toward the home router HR. At the intermediate VIP router, the AMT entry is checked, and the packet is transferred by changing its destination address to the C-addr corresponding to the H-addr of the mobile host MH (step S63).

In a case of carrying out the secret communication between the correspondent host CH and the mobile host MH, the encryption is carried out before the first encapsulation using the C-addr.

Note that, in case1, the direct communication using the C-addr is possible between the correspondent host CH and the mobile host MH.

(Case4)

In case4, the processing similar to that of case2 described above is carried out. If the data packet processing device is provided at the network 92, the secret communication can be carried out similarly as in case2.

(Case5)

In case5, the processing similar to that of case2 described above is carried out. Here, however, the correspondent host CH and the mobile host MH are located in the same network, so that it is possible to optimize the communication control by carrying out the direct communication using the H-addr whenever it is recognized that the correspondent host CH and the mobile host MH are located in the same network.

(Case6)

In case6, the processing similar to that of case3 described above is carried out. If the data packet processing device is provided at the network 92, the secret communication can be carried out similarly as in case3.

(Case7 to Case10)

In case7 to case10, the correspondent host CH is located in the network 93 at which the data packet processing device is not provided, so that the secret communication is not to be carried out. Also, the correspondent host CH is located in the external organization network, so that the correspondent host CH does not know the H-addr of the mobile host MH unlike the previous cases.

In case7 to case10, when the correspondent host CH has the AMT information corresponding to the mobile host MH (step S71 YES), the correspondent host CH transmits the packet by using the C-addr of the mobile host MH as a destination (step S74).

On the other hand, when the correspondent host CH does not have the AMT information corresponding to the mobile host MH (step S71 NO), the correspondent host CH transmits the packet by using the M-addr of the mobile host MH as a destination (step S72). In this case, the packet is transmitted toward the home router HR. At the intermediate VIP router, the AMT entry is checked, and the packet is transferred by changing its destination address to the C-addr corresponding to the M-addr of the mobile host MH (step S73).

In each of the above described cases, there can be a case in which the correspondent host CH does not have a valid AMT information corresponding to the mobile host MH (that is, a case in which the AMT information containing the C-addr for the mobile host MH has not yet reached to the correspondent host CH).

In such a case, the correspondent host CH transmits the packet by using the H-addr/M-addr (VIP address) as a destination. As a result, the packet is transmitted toward the home router HR.

Among the intermediate VIP routers, one router which has the same AMT version then transfers the packet by changing its destination address to a correct destination. When the AMT version of the router is older than that of the packet, the invalid flag is erected for the AMT entry in that router. When the AMT version of the router is newer than that of the packet, the packet is transferred to a new destination while updating the AMT entry of the packet.

Similarly, at every intermediate VIP router in a course of the packet transfer from the correspondent host CH to the mobile host MH, when the AMT version of the router is older than that of the packet, the invalid flag is erected for the AMT entry in that router, and when the AMT version of the router is newer than that of the packet, the packet is transferred to a new destination while updating the AMT entry of the packet.

In other words, in the VIP, the correspondent host CH initially throws the packet by attaching H-addr/M-addr which is the VIP address. If all the VIP routers do not have the AMT information of the mobile host MH, this packet will reach to the home router HR. The address of this packet is changed to the C-addr by the intermediate VIP router which has the AMT information for the mobile host MH, and routed toward the current location of the mobile host MH.

As described, the communication control method according to the present invention is applicable to various types of currently proposed mobile communication protocols.

Thus, according to the present invention, the address to be used for the mobile computer is selectively switched among two types of addresses (the first location identifier specific to the mobile computer which is uniquely desired within the own organization network and the second location identifier which is reserved for the mobile computer and uniquely defined over the entire network system) depending on the moved location of the mobile computer, so that it becomes possible to support the mobile computing without wasting a limited number of external network addresses as in a conventional scheme in which addresses uniquely defined over the entire network system are assigned to all the mobile computers.

Moreover, according to the present invention, when the mobile computer moves over the networks, it is possible to handle various control information such as that for a case of updating the information of the mobile computer or that for a case of invalidating the information of the mobile computer, so that it is possible to provide a mobile computing environment which can flexibly deal with a variety of mobile computing protocols.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A relay device for relaying communication data in a communication network system formed by a plurality of computers for communicating data with each other through a plurality of interconnected networks, said plurality of computers including at least one mobile computer for communicating data while changing a location in the communication network system, the relay device being provided in a home network of the mobile computer and comprising:

management means for managing an address information for the mobile computer within own organization networks of the mobile computer, the address information containing a corresponding set of a first location identifier, a second location identifier and a third location identifier, the first location identifier being a location identifier specific to the mobile computer which is uniquely defined within the own organization networks, the second location identifier being a location identifier reserved for the mobile computer which is uniquely defined over all the networks, and the third location identifier being a location identifier indicating a current visited location of the mobile computer in the communication network system which is uniquely defined over all the networks;

processing means for obtaining the third location identifier corresponding to the first location identifier or the second location identifier of a destination computer attached to communication data transmitted from a source computer according to the address information, and transferring the communication data by attaching the obtained third location identifier to the destination computer; and means for managing a plurality of location identifiers reserved for mobile computers belonging to the own organization networks, and assigning one of said plurality of location identifiers as the second location identifier to each mobile computer which is moving out to an external other organization network.

2. A relay for relaying communication data in a communication data in a communication network system formed by a plurality of computers for communicating data with each other through a plurality of interconnected networks, said plurality of computers including at least one mobile computer for communicating data while changing a location in the communication network system, the relay device being provided in a home network of the mobile computer and comprising:

management means for managing an address information for the mobile computer within own organization networks of the mobile computer, the address information containing a corresponding set of a first location identifier, a second location identifier and a third location identifier, the first location identifier being a location identifier specific to the mobile computer which is uniquely defined within the own organization networks, the second location identifier being a location identifier reserved for the mobile computer which is uniquely defined over all the networks, and the third location identifier being a location identifier indicating a current visited location of the mobile computer in the communication network system which is uniquely defined over all the networks; and processing means for obtaining the third location identifier corresponding to the first location identifier or the second location identifier of a destination computer attached to communication data transmitted from a source computer according to the address information, and transferring the communication data by attaching the obtained third location identifier to the destination computer;

wherein when the mobile computer is located within an external own organization network and the communication data has a destination specified by the first location identifier, the processing means encapsulates the communication data including the first location identifier using the third location identifier corresponding to the first location identifier and then transfers the communication data to the external own organization network.

3. A relay device for relaying communication data in a communication network system formed by a plurality of computers for communicating data with each other through a plurality of interconnected networks, said plurality of computers including at least one mobile computer for communicating data while changing a location in the communication network system, the relay device being provided in a home network of the mobile computer and comprising:

management means for managing an address information for the mobile computer within own organization networks of the mobile computer, the address information containing a corresponding set of a first location identifier, a second location identifier and a third location identifier, the first location identifier being a location identifier specific to the mobile computer which is uniquely defined within the own organization networks, the second location identifier being a location identifier reserved for the mobile computer which is uniquely defined over all the networks, and the third location identifier being a location identifier indicating a current visited location of the mobile computer in the communication network system which is uniquely defined over all the networks; and processing means for obtaining the third location identifier corresponding to the first location identifier or the second location identifier of a destination computer attached to communication data transmitted from a source computer according to the address information, and transferring the communication data by attaching the obtained third location identifier to the destination computer;

wherein when the mobile computer is located within an external other organization network and the communication data has a destination specified by the first location identifier, the processing means encapsulates the communication data using the third location identifier corresponding to the first location identifier, and then transmits the communication data to a data packet processing device provided in a home network of the mobile computer.

4. A relay device for relaying communication data in a communication network system formed by a plurality of computers for communicating data with each other through a plurality of interconnected networks, said plurality of computers including at least one mobile computer for communicating data while changing a location in the communication network system, the relay device being provided in a home network of the mobile computer and comprising:

management means for managing an address information for the mobile computer within own organization networks of the mobile computer, the address information containing a corresponding set of a first location identifier, a second location identifier and a third location identifier, the first location identifier being a location identifier specific to the mobile computer which is uniquely defined within the own organization networks, the second location identifier being a location identifier reserved for the mobile computer which is uniquely defined over all the networks, and the third location identifier being a location identifier indicating a current visited location of the mobile computer in the communication network system which is uniquely defined over all the networks; and processing means for obtaining the third location identifier corresponding to the first location identifier or the second location identifier of a destination computer attached to communication data transmitted from a source computer according to the address information, and transferring the communication data by attaching the obtained third location identifier to the destination computer;

wherein when the mobile computer is located within an external other organization network and the communication data has a destination specified by the first location identifier, the processing means replaces the first location identifier contained in the communication data by the second location identifier corresponding to the first location identifier, then encapsulates the communication data using the third location identifier corresponding to the first location identifier, and then transmits the communication data to the external other organization network.

* * * * *